United States Patent Office 2,948,702
Patented Aug. 9, 1960

2,948,702

COATING COMPOSITIONS CONTAINING ALKENYL PHENOL-ALDEHYDE RESINS AND STRUCTURES PREPARED THEREFROM

Henry A. Vogel, Richland Township, Pa., and Robert F. Roach, Milwaukee, Wis., assignors to Pittsburgh Plate Glass Company No Drawing. Filed May 14, 1957, Ser. No. 658,977

8 Claims. (Cl. 260—43)

This invention relates to heat hardenable resin compositions characterized by extremely light color, and by excellent chemical resistance and fabrication properties.

The service requirements for sanitary coating compositions used on metals fabricated into containers for food, beverages, liquid soaps and detergents and similar materials are very high. For example, these coating compositions must possess the following characteristics to a substantial degree if they are to be utilized in commercial applications:

(1) Must not impart taste, contamination or toxicity to the food or beverages with which films of the coating compositions are in contact.
(2) Must adhere firmly to the metallic surfaces to which they are applied.
(3) Must be clear or light colored.
(4) Must be flexible enough when baked to withstand fabrication into curved or angular containers or closures.
(5) Must withstand the action of solvents, acids, alkalis and other chemicals.
(6) Must withstand the relatively high temperatures encountered in the processing and sterilization of food without loss of adhesion, "blushing," a condition evidenced by a milky, opaque appearance and indicating a general softening, blistering and degradation of the film.
(7) Must be able to tolerate pigmentation.
(8) Must deposit a continuous film free of voids and surface irregularities.

A great deal of research and development has been carried out in the past and is continuing in order to produce better sanitary coating compositions, necessitated at least in part by the fact that available materials are not entirely satisfactory, particularly for use in packaging new food and beverage products and synthetic detergents. Numerous attempts have been made to utilize phenol-aldehyde resins in sanitary coating compositions, both in a modified and unmodified form. The unmodified phenol-aldehyde resins per se have proved unsatisfactory for several reasons. For example, they ordinarily impart undesirable taste to food products with which they are in contact, and the films are too brittle to withstand fabrication into curved and angular shapes. Modification of the phenol-aldehyde resins with other materials such as oils which serve as plasticizers permits fabrication into container forms, but the undesirable taste imparting properties of the resulting films are so objectionable as to render the modified materials practically useless for most packaging purposes.

Attempts have also been made to utilize the vinyl resins such as polymers and copolymers of vinyl chloride, vinylidene chloride, vinyl acetate, acrylates and the like as sanitary coating compositions. These materials, while possessing excellent fabrication properties, will not withstand the temperatures at which sanitary liner compositions are initially baked onto the container surface (about 400° F.) or the temperatures at which the container side seams are soldered (about 375° F. to 700° F.), unless one or more prime coats of a heat-resisting material are first applied to the metallic surface. This is obviously a costly and time-consuming procedure. Moreover, at food processing temperatures above about 200° F., the vinyl resin container linings "blush" severely and are thermoplastic, which are undesirable properties that limit their use in an unmodified form to applications where relatively low temperatures are utilized.

Recently, however, more useful sanitary coating compositions have been obtained by modifying vinyl resins with a compatible amount of certain phenol-aldehyde resins, particularly those resins prepared by the condensation of phenol, or an alkyl substituted phenol such as cresol or xylenol, with formaldehyde. These materials, while useful for many purposes, possess several disadvantages. For instance, they tend to be of a rather dark golden or reddish color, and cannot readily be pigmented into pleasing whites, so much in demand for use on glass container closures, particularly on containers used in packaging the ever increasingly popular baby foods. Moreover, such blends tend to be unstable and often contain gel particles after relatively short periods of storage. Films prepared from such compositions appear to have an undesirable film of precipitate on the surface thereof. Also such resin blends are not as resistant to the action of solvents and other chemicals as is ordinarily desired, and in some instances impart undesirable tastes to food and beverage products with which they are in contact.

In U.S. Patent No. 2,006,043, it is disclosed that alkenylphenols obtained by the method described in Berichte 59, 2350 (1926), which involves the reaction of crotyl bromide with phenol, can be condensed with formaldehyde to form resins which are described as being reddish brown in color and giving slow drying films. Consequently, such resins when combined with other resinous materials cannot be utilized to give light colored films. In another U.S. patent, 2,587,578, it is disclosed that light colored alkenylphenol-aldehyde resins can be obtained only if the resin is made solely from the para-isomer. The separation of para-isomers from a mixture of alkenylphenol isomers is obviously a time-consuming and expensive procedure.

It has now been discovered that extremely light unpigmented films, and white pigmented films can be obtained by modifying vinyl resins with the condensation product of an aldehyde with a mixture of alkenylphenols obtained by the reaction of an acyclic conjugated diene with a phenol in the presence of a Friedel-Crafts catalyst, and consisting predominantly of ortho- and para-monoalkenylphenols. Contrary to the disclosure of Dykstra, the compositions obtained utilizing such a mixture of alkenylphenols in the preparation of the phenolic resin, which is subsequently alcoholated, results in clear films which have almost no color, and in pigmented films which are white in contrast to the conventional tan or brown of other phenolic resin films. Also contrary to the disclosure in the Jones patent, 2,587,578, mixtures of both ortho- and para-alkenylphenols can be utilized so long as they are prepared by the reaction of a phenol and an acyclic conjugated diene in the presence of a Friedel-Crafts catalyst, and the resulting phenol-aldehyde resin alcoholated.

The compositions prepared in accordance with this invention adhere very firmly and in continuous films to the metallic surfaces to which they are applied, and bake quickly to give films which are readily fabricated into curved or angular containers or closures without rupture of the film continuity, are very resistant to the reaction of solvents, acids, alkalis and other chemicals, easily withstand the temperatures encountered in the processing and sterilization of foods without loss of adhesion or "blushing," do not impart taste, contamination or toxicity to foods or beverages, and can be pigmented with materials such as titanium dioxide to give white sanitary coating compositions particularly useful on container closures.

The alkenylphenol-aldehyde resins which are blended with carboxyl or hydroxyl modified vinyl resins in accordance with the present invention are prepared by the condensation of an aldehyde, and particularly formaldehyde, with a mixture of alkenylphenols consisting predominantly of ortho- and para-monoalkenylphenols, said mixture being obtained by the reaction of a phenol with an acyclic conjugated diene in the presence of a Friedel-Crafts catalyst. Among the alkenylphenols which can be included in such mixtures are the following:

o-2-butenylphenol
p-2-butenylphenol
Di-2-butenylphenol
Tri-2-butenylphenol
Butenylcatechols
Butenylcresols
Butenyl-2,5-dichlorophenol
Butenyl-2,5-dinitrophenol
Butenyl-2,3-dimethoxyphenol
Butenylresorcinol
Dibutenylresorcinol
Tributenylresorcinol
Butenylguaiacol
Dibutenylguaiacol
Tributenylguaiacol
2-chlorobutenylcresol
2-chlorobutenylphenol
2-iodobutenylphenol
o-Cyclopentenylphenol
p-Cyclopentenylphenol
Dicyclopentenylphenol
Tricyclopentenylphenol
Pentenylphenol
Pentenylcresol
Pentenylguaiacol
Chloropentenylphenol
Bromopentenylphenol
Chloropentenylguaiacol
Hexenylphenol
Hexenylcresol
Dihexenylcresol
Trihexenylcresol
Chlorohexenylphenol
Chlorohexenylchlorophenol
Chlorohexenylcatechol In addition to the above alkenylphenols, other mixtures of alkenylphenols consisting predominantly of ortho- and para-monoalkenylphenols may also be condensed with aldehydes such as formaldehyde to give thermosetting resins which can in turn be utilized to modify vinyl resins. It is also possible to utilize in the mixture of alkenylphenols a minor proportion of phenol or an alkyl substituted phenol.

The preparation of alkenylphenols is described in detail in a series of copending applications, Serial Nos. 300,359, filed July 22, 1952, now U.S. Patent No. 2,864,868, and 337,226, 337,227 and 337,228, all filed February 16, 1953, and now abandoned. The methods disclosed therein involve generally the reaction of phenolic compounds with dienes in the presence of Friedel-Crafts catalysts. In the processes described in the copending applications mentioned hereinabove, a mixture of alkenylphenols, including about 55 percent to 85 percent to monoalkenylphenols (ortho- and para-monoalkenylphenols) and about 15 percent to 45 percent of higher boiling phenols, including di- and tri-alkenylphenols, is generally obtained. Minor quantities of ethers and polyphenols are also formed. In this manner a mixture of mono-, di-, and tributenylphenols, predominantly ortho- and para-monoalkenylphenols, is obtained by the reaction of butadiene-1,3 with phenol. Mixtures consisting predominantly of ortho- and para-monobutenylphenols, and including di- and tri-butenylphenols are especially preferred since they are very economically obtained from inexpensive starting materials.

Methods for preparing resinous products by the condensation of alkenylphenols with aldehydes, and particularly formaldehyde, are disclosed in copending applications, Serial Nos. 390,088 and 390,089, both filed November 3, 1953, now U.S. Patent. No. 2,843,565 and 2,843,566, respectively. In these applications it is disclosed that the condensation reaction can readily be effected by bringing the mixture of alkenylphenolic compounds together with the aldehyde, which preferably is composed only of atoms of carbon, hydrogen and oxygen, and either an acidic or alkaline catalyst, preferably by adding the aldehyde slowly to an alkenylphenol-catalyst mixture at about room temperature (25° C.) until solution of the phenolic component is obtained, after which the temperature is allowed to rise to about 35° C., at which level it is maintained until the remainder of the aldehyde is added. The reaction is then allowed to proceed for about 48 hours at room temperature. The reaction mixture is then acidified to a pH of about 5.0 with a mineral acid such as hydrochloric acid or sulfuric acid or with a carboxylic acid such as acetic acid or propionic acid. During the acidification, two layers are formed, one of water and the other of alkenylphenol resin. The water layer is drawn off and the water-insoluble layer of resin is water washed four or five times.

The resinous product may be freed of any water remaining therein by vacuum stripping at a pressure of about 20 to 55 millimeters of mercury (absolute). Alternatively, the water may be removed azeotropically by adding xylene, toluene or butanol and distilling. The mixture may also be blown with an inert gas such as carbon dioxide or nitrogen to remove the water.

Useful expedients which may be employed in carrying out the condensation reaction involve the incorporation in the original reaction mixture of an alkali metal hydrosulfite to reduce any quinone type compounds present to the corresponding hydroquinone compounds. This prevents harmful color formation which takes place in the presence of quinone type compounds. Another useful expedient involves the addition to the acidified reaction mixture of a small portion of a complexing, a sequestering, or a chelating agent, for example, ethylenediamine tetraacetic acid to inactivate any metallic ions which may be present and which also cause undesirable color in the resinous reaction product.

As set forth hereinabove, either acidic or alkaline catalysts may be employed. Preferably alkaline catalysts such as hexamethylenetetraamine, ammonia, sodium hydroxide, potassium hydroxide, and the like are utilized, although useful resins can also be obtained when the condensation is carried out in the presence of an acidic material such as hydrochloric acid or acetic acid.

The alkenylphenol-aldehyde resins thus obtained are then refluxed with an alcohol, preferably one containing from 1 to 10 carbon atoms, including methanol, ethanol, butanol, 2-ethylhexanol, decanol, and the like. The refluxing reaction is carried out at a pH below 7.0 and preferably at about 4.0, ordinarily for a period of from 2 to 3 hours, depending upon the degree of alcoholation desired, with the longer periods obviously giving a greater degree of alcoholation.

The vinyl resins which are modified with alkenylphenol-aldehyde resins in accordance with this invention are basically copolymers of a vinyl halide such as vinyl chloride or vinyl bromide with a vinyl ester of an aliphatic monocarboxylic acid such as vinyl acetate, vinyl propionate, vinyl butyrate, or the like. The aliphatic monocarboxylic acid portion of the vinyl ester molecule should contain no more than 6 carbon atoms (as represented by caproic acid) with vinyl acetate being the preferred ester of this class.

However, the basic copolymers of vinyl halides and vinyl esters of aliphatic monocarboxylic acids are per se incompatible with alkenylphenol-aldehyde resins except at levels below 5.0 percent, and such small amounts produce no significant advantage over the alkenylphenol-aldehyde resins alone.

Accordingly, in order to achieve desired compatibility of the vinyl resin and the alkenylphenol-aldehyde resin, it is necessary that the copolymer of the vinyl halide and vinyl ester of an aliphatic monocarboxylic acid be modified with a minor proportion of a third component, preferably one which introduces either carboxyl (—COOH) or hydroxyl (—OH) groups into the polymer structure. Carboxyl groups are readily introduced into the copolymer by the use in the polymerization process of an unsaturated acid such as maleic acid and fumaric acid, and the hydroxyl groups are introduced into the copolymer chain by alkaline hydrolysis of at least a portion of the ester linkages in the copolymer structure.

In the modified copolymers or interpolymers the vinyl halide is the predominant component, ordinarily being present in an amount of about 50 percent to 95 percent by weight, while the ester of an aliphatic monocarboxylic acid is present in an amount of about 2 percent to 45 percent by weight. As indicated hereinabove, the carboxyl or hydroxyl component is present in the minor proportion, ordinarily in an amount of about 1 percent to 3 percent by weight, calculated as hydroxyl or carboxyl. One particularly useful vinyl resin for modifying alkenylphenol-aldehyde resins contains approximately 86 percent vinyl chloride, approximately 12 percent vinyl acetate, and approximately 1 percent carboxyl component, normally maleic acid. A preferred hydroxyl modified vinyl resin contains approximately 91 percent vinyl chloride, approximately 3 percent vinyl acetate and approximately 2.3 percent hydroxyl component (approximately 6 percent when calculated as vinyl alcohol). The above vinyl resins are readily available as commercial products, as are other vinyl halide-vinyl ester copolymers modified with either carboxyl or hydroxyl groups.

The alkenylphenol-aldehyde resins, and particularly butenylphenol-aldehyde resins, are compatible with vinyl resins of the type disclosed in the foregoing paragraph in an amount up to about 30 percent or 35 percent by weight on a resin solids basis. It has been found that the best sanitary coating compositions are obtained when a blend containing about 25 percent alkenylphenol-aldehyde resin solids and about 75 percent vinyl resin solids is employed. Blends of the two resin components are readily formulated into coating compositions by the use of such solvents as butanol, methyl ethyl ketone, methyl isobutyl ketone, butyl Cellosolve, high flash aliphatic and/or aromatic naphthas, and isophorone. Preferably the blends are formulated into coating compositions having a No. 2 Zahn cup viscosity of about 28 to 32 seconds and about 25 percent to 28 percent total solids. The sanitary coating compositions are most readily applied to metallic surfaces by roller coating, although they can also be applied by other methods such as spraying, brushing, or the like. Films of about 15 to 20 mgm. per 4 square inches can be obtained by roller coating.

The films cure on tin plate to give good fabrication properties and solvent resistance within the range of about 8 minutes at 390° F. to about 10 minutes at 360° F. Higher or lower temperatures may also be utilized, although obviously the time of cure will vary. At extremely high curing temperatures slight vinyl discoloration may be encountered and as a precautionary measure it is desirable to add a small quantity, ordinarily about 2 percent or less of a vinyl stabilizer such as one of the various epoxide resins which are commercially available for such purposes. Film thicknesses as great as 30 to 40 mgm. per 4 square inches can be built up by two-coat applications; however, a size coat is not necessarily required, and, in fact, makes good flow-out of the roll coated material somewhat more difficult to obtain.

The stability of blends of alkenylphenol-aldehyde resins with vinyl resins is excellent, and sanitary coating compositions containing these blends may be stored for extended periods of time without deleterious effect to the composition. In this respect, the compositions of the present invention are unique in that coating compositions containing resinous condensation products of phenol or an alkyl substituted phenol with an aldehyde are ordinarily of relatively poor stability due to gelation of a portion of the phenol-aldehyde resin component to give a precipitate which cannot be redissolved by agitation and which seriously impairs the appearance of films prepared from such compositions.

As will be evident from the specific examples hereinbelow, the blends of alkenylphenol-aldehyde condensation products and vinyl resins can be pigmented with conventional pigments such as titanium dioxide, carbon black, and the like to give colored enamel liner compositions. The pigmentation is preferably at a level of about 0.75 pound of pigment per pound of vinyl resin solids. The resulting enamels can also be roll coated, normally at a No. 2 Zahn cup viscosity of about 40 to 42 seconds, and thicknesses of about 20 to 25 mgm. per 4 square inches can be applied per coat with two coats giving slightly better gloss and hiding appearance. The pigmented compositions give films which cure in the range of about 8 minutes at 360° F. to 10 minutes at about 370° F.

The following examples illustrate in greater detail the preparation of resins by the condensation of alkyenylphenols with aldehydes, and the use of the resulting condensation products in blends with carboxyl and hydroxyl modified vinyl resins. The examples are not intended to limit the invention, however, for there are, of course, numerous possible variations and modifications.

*Example 1*

The following materials were charged into a glass-lined reactor:

24.6 pounds mixed butenylphenols (including monobutenylphenols, di- and tributenylphenols; predominantly ortho- and para-monobutenylphenols)
27.0 pounds formalin solution (37 percent formaldehyde)
1.7 pounds sodium hydroxide
1.7 pounds water
0.12 pound sodium hydrosulfite The resulting mixture was cooled to about 75° F. to 80° F. and the reaction mixture agitated for 5 hours after which it was allowed to stand for an additional 43 hours. The reaction mixture was then acidified to a pH of 5.0 with 68 percent sulfuric acid, and allowed to stand until a water layer settled out. The water layer was then drawn off and discarded. The wet resin (36.25 pounds) was treated with 0.04 pound of an aminotetracarboxylic acid known commercially as Sequestrene AA, and believed to be ethylenediaminetratraacetic acid. The resin was then heated to 220° F. and stripped with an inert gas until a Gardner viscosity of W at 75 percent solids in n-butanol was reached. The resin was then thinned with 10 pounds of n-butanol and filtered at 110° F. The product thus obtained had the following properties:

Weight per gallon_____ 8.45 pounds.
Solids_____ 66.2 percent at 110° C.
Viscosity (Gardner)_____ Q to R.

*Examples II to VIII*

In the following examples, a number of different alcohols were heated with the butenylphenol-formaldehyde resin (prepared according to the method of Example I) and distilled to remove any solvents present. In each example, 100 grams of the butenylphenol-formaldehyde resin and 0.2 gram of maleic anhydride were admixed with the alcohol. In Examples II through VII, 100 grams of toluene were added and the mixture refluxed azeotropically for 3 hours (in Example IV for 2 hours); in Example VIII the toluene was omitted and the mixture heated to reflux. The specific alcohol ultilized and the quantity thereof, the yield, the percent solids, the Gardner color and viscosity are set forth in the accompanying table:

| Example | Charge | | | Yield (parts) | Percent solids | Color (Gardner) | Viscosity (Gardner) |
| --- | --- | --- | --- | --- | --- | --- | --- |
| | Parts Toluene | Alcohol | Parts Alcohol | | | | |
| II | 100 | Butyl Alcohol. | 25 | 201.1 | 50.8 | 7 | A- |
| III | 100 | Castor oil Alcohol. | 25 | 226.0 | 49.1 | 6 | E-F |
| IV | 100 | Butane diol-1,4. | 25 | 227.6 | 46.2 | 6 | A- |
| V | 100 | Soya Alcohol. | 25 | 200.2 | 54.9 | 6 | A- |
| VI | 100 | Lauryl Alcohol. | 25 | 226.4 | 46.5 | 6 | A- |
| VII | 100 | 2-ethyl hexanol-1. | 25 | 225.7 | 46.6 | 6 | A- |
| VIII | | Allyl Alcohol. | 100 | 202.4 | 48.5 | 7-8 | A- |

*Example IX*

Five hundred grams of a butenylphenol-formaldehyde resin prepared according to the method of Example I and having a solids content of 74.4 percent was acidified to a pH of about 4.0 and admixed with 150 grams of butanol and 0.75 gram of ethylenediamine-tetraacetic acid. The resulting mixture was then refluxed until a temperature of 270° F. was reached (2½ hours). The resulting resin had a solids content of 61.3 percent, a Gardner-Holdt viscosity of A and a Gardner color of 9–10.

*Example X*

A resin prepared according the the method of Example IX was formulated into a sanitary coating composition having the following components in the amounts set forth:

| | Parts by weight |
| --- | --- |
| Hydroxyl modified vinyl chloride-vinyl acetate acetate copolymer, approximately 91% vinyl chloride, approximately 2.3% hydroxyl, and approximately 3% vinyl acetate | 152.0 |
| Methyl isobutyl ketone | 483.0 |
| Butenylphenol-formaldehyde resin (66% solids) | ¹75.0 |
| Isophorone | 26.0 |
| Epoxide resin stabilizer | 7.0 |

¹ 50 parts resin solids.

The resulting solution had a No. 2 Zahn cup viscosity of 28 to 30 seconds, a total solids of 27.6 percent, and a liquid weight of 7.43 pounds per gallon.

The solution was then roller coated onto tin plate and baked for 8 minutes at 390° F. The resulting film was clear and substantially colorless and adhered firmly to the tin plate. The tin plate could be fabricated into severe curvatures or angles without rupture of the film. Film rupture in fabrication with a punch press was tested by immersion in an acidic copper sulfate solution to determine if any copper plating occurred. The complete absence of copper plating indicated that the film continuity was not disrupted by even minute fractures. When immersed in a synthetic liquid detergent (believed to be a sodium salt of a sulfonated $C_{10}$–$C_{12}$ alcohol or a polyoxyethylene derivative of an alcohol) for 30 days at 130° F., no failure of the film occurred. When heated to fruit processing temperatures, 240° F., in the presence of canned pears, no taste or toxicity was apparent.

*Example XI*

This example illustrates the preparation of pigmented sanitary coating compositions prepared from blends of alkenylphenol-aldehyde resins with vinyl resins.

A pigmented composition was prepared according to the following formulation:

| | Parts by weight |
| --- | --- |
| Carboxyl-modified copolymer of vinyl chloride and vinyl acetate | 105.2 |
| Methyl isobutyl ketone | 316.0 |
| Butenylphenol-formaldehyde resin (prepared according to the method of Example I) | 70.2 |
| Isophorone | 44.6 |
| High flash solvent naphtha | 43.1 |
| Butyl Cellosolve | 21.0 |
| Titanium dioxide pigment | 210.6 |

The resulting coating composition had a liquid weight of 8.18 pounds per gallon and a No. 2 Zahn cup viscosity at 35 percent solids of 46 seconds. A sheet of tin plate was sized with a thin roller coat film of a clear material prepared substantially according to the previous example, and baked for 10 minutes at 360° F. Over the size coat a second coat of the pigmented composition prepared according to this example was applied and baked for 10 minutes at 375° F. The stock coated in this manner is extremely light colored and in this respect is considerably lighter than sanitary coating compositions containing other phenolic resins such as those prepared by the condensation of phenol or m-cresol with formaldehyde. The coated tin plate was then punched into container closures and was found to fabricate very satisfactorily as shown by the fact that immersion in acidic copper sulfate solution produced no copper plating. No loss of adhesion of curling was observed after a 10 minute dry heat test at 190° F. and the lining did not stain when subjected to process temperature in the presence of red beets. No objectionable taste was encountered after processing in the presence of pears and no loss of adhesion occurred when samples were immersed in water for 1 hour at 240° F., and held under autoclave pressure.

A second sample of tin plate was coated directly to a thickness of 18 to 20 mgm. per 4 square inches without first having applied thereto a size coat. The tin plate was then punched into container closures and given the same tests as the tin plate having two coats applied thereto. In each instance the material having only a single coat application performed substantially as well as the material having two coats. This indicates that a single coat application of the sanitary coating compositions of this invention is satisfactory with the size coat merely acting as an additional safety factor.

The pigmented coating composition of this example was compared with a coating composition prepared utilizing a well known commercial phenolic resin known as P-97, the condensation product of saturated phenols with formaldehyde. Pigmentation was at the same level in each composition. Films of each composition were coated onto tin plate to a thickness of 25 mgm. per 4 square inches and baked at 400° F. for 10 minutes. The films prepared from the alkenylphenol-aldehyde resins were extremely light whereas the films prepared from the saturated phenol-aldehyde resin were dark tan in color.

When the above exaamples are repeated utilizing resinous condensation products of formaldehyde with other alkenylphenols such as isopentenylphenol, pentenylphenol, or the like, in place of the butenylphenol-formaldehyde resins, sanitary coating compositions are obtained which are generally equivalent to those of the specific examples. Similarly, when other compatible vinyl resins are substituted for the carboxyl or hydroxyl modified vinyl chloride-vinyl acetate copolymers, good results are obtained. Also, the clear sanitary coating compositions may be transformed into clear colored compositions by the addition of minor amounts of a soluble dye or a dark colored resin.

From the foregoing description of the invention, it will be seen that the alkenylphenol-aldehyde resin compositions containing hydroxyl or carboxyl modified vinyl halide-vinyl ester copolymers in accordance with the present invention constitute a new and useful class of coating compositions. It is apparent, therefore, that various embodiments of the invention, in addition to those specifically disclosed may be provided without departing from the spirit and scope of the invention as defined in the appended claims.

This application is a continuation-in-part application of copending application, Serial No. 416,404, filed March 15, 1954, now abandoned.

We claim:
1. A composition which can be spread upon metal and baked to a clear, light-colored film, said composition comprising a mixture of (1) a resinous condensation product of an aldehyde containing only atoms of carbon, hydrogen and oxygen, with a mixture of alkenylphenols containing at least 4 carbon atoms in each alkenyl radical, said mixture being obtained by the reaction of an acyclic conjugated diene with a phenol in the presence of a Friedel-Crafts catalyst, and consisting predominantly of ortho- and paramonoalkenylphenols, which resinous condensation product has been refluxed with an alkanol in an acidic reaction medium, and (2) a member of the class consisting of copolymers of a vinyl halide and a vinyl ester of a saturated aliphatic monocarboxylic acid containing no more than 6 carbon atoms, said vinyl halide being present in an amount of about 50 percent to 95 percent by weight, said copolymer containing in the copolymer chain about 1 percent to 3 percent of a carboxyl component, and copolymers of a vinyl halide and a vinyl ester of a saturated aliphatic monocarboxylic acid containing no more than 6 carbon atoms, said vinyl halide being present in an amount of about 50 percent to 95 percent by weight, said copolymer containing in the copolymer chain from about 1 percent to 3 percent of a hydroxyl component, the resinous condensation product (1) in said composition being present in an amount of from 5 percent to 35 percent by weight.

2. The composition of claim 1 wherein the mixture of alkenylphenols is a mixture of butenylphenols, and wherein the resinous condensation product (1) is present in an amount of 20 percent to 35 percent by weight.

3. The composition of claim 2 wherein the aldehyde is formaldehyde.

4. The composition of claim 3 wherein component (2) is a copolymer of about 91 percent vinyl chloride, about 3 percent vinyl acetate, and containing about 2.3 percent hydroxyl groups.

5. The composition of claim 3 wherein component (2) is a copolymer of about 86 percent vinyl chloride, about 12 percent vinyl acetate, and containing about 1.0 percent carboxyl groups.

6. A structure having thereon and adherent thereto a film of the composition of claim 1.

7. The composition of claim 4 wherein said composition contains a pigment.

8. The composition of claim 5 wherein said composition contains a pigment.

References Cited in the file of this patent

UNITED STATES PATENTS

| Number | Name | Date |
| --- | --- | --- |
| 2,006,043 | Dykstra | June 25, 1935 |
| 2,175,393 | Hentrich et al. | Oct. 10, 1939 |
| 2,242,250 | Honel et al. | May 20, 1941 |
| 2,337,424 | Stoner et al. | Dec. 21, 1943 |
| 2,458,639 | Quarles | Jan. 11, 1949 |
| 2,512,726 | Penn et al. | June 27, 1950 |
| 2,570,513 | Block | Oct. 9, 1951 |
| 2,587,578 | Jones | Mar. 4, 1952 |
| 2,793,141 | Barr | May 21, 1957 |

UNITED STATES PATENT OFFICE
CERTIFICATION OF CORRECTION

Patent No. 2,948,702                                August 9, 1960

Henry A. Vogel et al.

It is hereby certified that error appears in the above numbered patent requiring correction and that the said Letters Patent should read as corrected below.

Column 7, line 35, for "the", first occurrence, read -- to --; line 41, strike out "acetate"; column 8, line 75, for "exaamples" read -- examples --.

Signed and sealed this 1st day of August 1961.

(SEAL)
Attest:

ERNEST W. SWIDER
Attesting Officer

DAVID L. LADD
Commissioner of Patents